March 17, 1953  R. W. KRITZER  2,631,401
FISHING TACKLE
Filed June 19, 1947
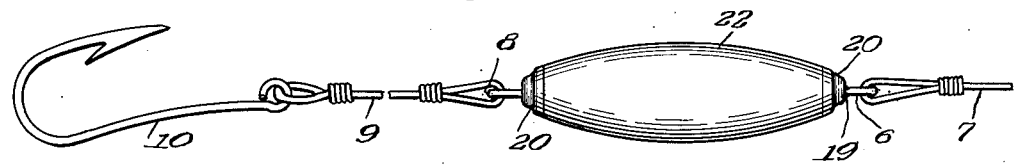
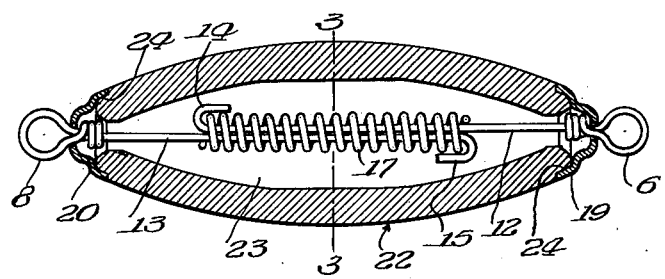
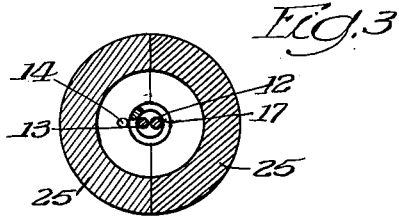
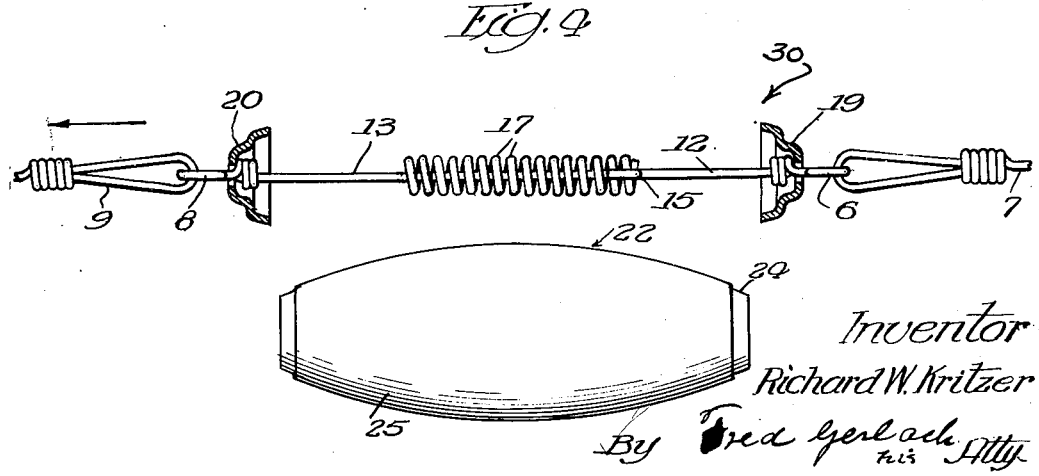
Inventor
Richard W. Kritzer
By Fred Gerlach
his Atty.

Patented Mar. 17, 1953

2,631,401

UNITED STATES PATENT OFFICE 2,631,401

FISHING TACKLE

Richard W. Kritzer, Chicago, Ill., assignor of one-half to A. B. Bassi and one-half to D. H. Burbidge, both of Chicago, Ill.

Application June 19, 1947, Serial No. 755,706

10 Claims. (Cl. 43—43.12)

The invention relates to fishing tackle.

In fishing, a sinker is usually used on the fishing line for causing the hook and lure to descend to the desired depth in the water. In fishing for large fish such as tarpon, muskellunge and pike, the fish after being initially hooked, usually endeavors by violent shaking and struggling, to remove the hook from its mouth. During this struggling and violent shaking, the inertia of and reactionary stresses on the sinker, offer resistance to the hook, and aid the fish during the shaking of its head, to free itself from the hook. This inertia and these reactionary stresses on the sinker, tend to resist the angular movement of the hook relatively to the fish's head, and facilitate the displacement of the hook from the fish's mouth during these struggles, and thereby increase the possibility of the fish being lost from the hook.

One object of the invention is to provide fishing tackle which includes a sinker which will be automatically dropped into the water and released from the fishing line to prevent the sinker from aiding the fish in struggling off the hook.

Another object of the invention is to provide fishing tackle which includes a holder which is adapted to be connected to the fishing line and to the hook, and a sinker which will be automatically released from the line and dropped into the water upon the initial jerk or stress upon the hook after the fish has been hooked.

These objects are accomplished primarily by providing a holder, which is adapted to be connected respectively, to the fishing line and to the hook or lure, and includes relatively movable elements for retaining a sinker which is separable from the holder, and whereby the sinker will be automatically released and dropped as soon as a predetermined pull is exerted upon the hook.

Other objects of the invention will appear from the detailed description.

The invention consists in the several features hereinafter set forth and more particularly defined by claims at the conclusion hereof.

In the drawings:

Fig. 1 is a side elevation of fishing tackle embodying the invention.

Fig. 2 is a view partly in longitudinal section through the end members of holder and the separable sinker sections, the holder being shown in position to retain them in the holder.

Fig. 3 is a transverse section taken on line 3—3 of Fig. 2.

Fig. 4 is a view section of the holder partly in section as extended to release the sinker, the latter being shown released and dropped from the holder.

The invention is exemplified in a sinker holder which comprises a pair of slidably connected elements which are provided at the opposite ends of the holder with an eye 6 for connection in any suitable manner, to a fishing line 7, and with an eye 8 which is adapted for connection in any suitable manner, usually through a leader 9, to a fish-hook 10. In lieu of a fish-hook, an artificial lure provided with a hook or a gang of hooks, or hooks with bait thereon, may be used.

The eyes 6 and 8 are respectively formed on a pair of slidably connected elements, which include stems 12 and 13. These elements are usually formed of wire bent to provide a stem and an integral eye, and are slidable relatively to each other. The inner ends of stems 12 and 13 are provided with inwardly extending hooks 14 and 15, which may be formed as continuations of or integral with, the said stems, respectively. A compression spring 17 is coiled around the overlapping portions of stems 12 and 13 between hooks 14 and 15, and normally urges the elements 12 and 13 to move the eyes 6 and 8 toward each other and permits the said eyes to be spread apart by a pull in opposite directions exerted on the eyes 6 and 8. The spring 17 is coiled around the stems and holds them in slidably connected relation. A thimble or ferrule 19 is secured against longitudinal movement on stem 12, and a thimble or ferrule 20 is similarly secured on stem 13. Each of these thimbles is confined between its associated eye and the wrapping of the end of the wire from the eye around the stem, for causing the thimbles to move longitudinally with the eyes, respectively.

The sinker, generally designated 22, is in the form of a hollow or annular body which is provided with a cavity 23 for housing the stems 12 and 13 and the spring 17. The ends of the sinker are provided with reduced ends 24 which are adapted to fit into the thimbles 19 and 20. The outer periphery of the sinker is convex, to facilitate its passage through the water. The sinker is composed of mating sections 25 so that when the thimbles 19 and 20 are spread apart longitudinally, the sections will be free to separate from each other and drop off the holder. The ends 24 of the sinker, when confined in thimbles, will be longitudinally gripped by the force of spring 17 which yieldingly acts on the stems to urge the eye and thimble at one end toward the eye and thimble at the other end. The sections 25 are held together in mating relation by the thimbles. When a pull of sufficient magnitude is exerted on the eye 8, the spring 17 will yield and permit the thimbles to be spread apart a sufficient distance to disengage the ends from the sinker and permit the sections 25 to fall apart and drop off the holder into the water.

In the embodiment of the invention shown and described, the holder, which is generally designated 30, includes slidably connected sections 12 and 13, and end members 19 and 20 between which the sinker sections are releasably held; the eye 6 exemplifies means on section 12 which adapts section 12 for connection to a line; the eye 8 exemplifies means on section 13 which adapts section 13 for connection to a fish hook, and spring 17 exemplifies means around sections 19 and 20 for holding the end members 19 and 20 to retain the sinker sections and to release and drop them when a predetermined pull is executed on the holder.

In use, the sections 25 of the sinker will be placed around the stems 12 and 13 while the eyes 6 and 8 are pulled apart against the force of spring 17. The eyes 6 and 8 are then released so that the thimbles will engage the reduced ends 24 of the sinker. The sections of the sinker will then be held together and in the holder. The sinker may be placed on the holder while the eyes 6 and 8 are connected to the fishing line and to the hook. When the sinker has been thus placed in the holder, it will be yieldingly gripped longitudinally between thimbles 19 and 20 and its sections 25 will be held together around stems 12 and 13. Spring 17 is of sufficient magnitude to retain the thimbles engaged with the ends of the sinker against release by the usual drag or resistance produced by the hook or lure as it travels through the water while fishing. When a sufficiently great predetermined pull is exerted on the hook, after the fish has initially been caught by the hook, such as is caused by the violent shaking of the fish in its efforts to spit out or get rid of the hook, spring 17 will yield and permit the thimbles 19 and 20 to be spread apart and disengaged from the ends of the sinker, as illustrated in Fig. 4. The sinker sections will fall apart and drop off into the water. This dropping of the sinker occurs during the first struggle of the fish to escape from the hook, so that thereafter the sinker will not, by its inertia and reaction, aid the fish in freeing itself from the hook.

It sometimes occurs when a fish rises near a boat, in its attempts to free itself from the hook, if it remains attached to the fishing line, the fish will throw the sinker so it may injure the fisherman in the boat. By dropping the sinker at the time the fish is initially caught on the hook, this danger is avoided. When the sinker has been dropped, the spring 17 and holder serve as a minor snubbing device. The holder is adapted to receive and drop sinkers of different weights, and may be formed of any suitable number of mating sections.

The invention exemplifies a holder and a separable sinker which will be automatically dropped during the initial struggles of the fish to escape from the hook, and which may be readily placed in the holder. It also exemplifies a holder for a sinker which is composed of separable mating sections which will fall apart when they are released by the holder.

The invention is not to be understood as limited to the details described, since these may be modified within the scope of the appended claims without departing from the spirit and scope of the invention.

Having thus described the invention, what I claim as new and desire to secure by Letters Patent is:

1. Fishing tackle comprising: a holder including relatively movable elements provided with means at their ends for connection to a fishing line and to a fish-hook, respectively, a sinker separable from the holder and including separable mating sections, and means on the elements for releasably gripping the sinker and holding the sections in mating relation and dropping the sections from the holder when a predetermined pull is exerted on the holder.

2. Fishing tackle comprising: a holder including relatively movable elements provided with means at their ends for connection to a fishing line and to a fish-hook, respectively, a sinker separable from the holder and including separable mating sections, and spring actuated means on the elements for releasably gripping the sinker and holding the sections in mating relation and dropping from the sections the holder when a predetermined pull is exerted on the holder.

3. Fishing tackle comprising: a holder including relatively movable elements provided with means at their ends for connection to a fishing line and to a fish-hook, respectively, a sinker separable from the holder and including separable mating sections forming a body, and means on the elements for releasably gripping the sinker and holding the sections in mating relation and dropping the sections from the holder when a predetermined pull is exerted on the holder.

4. Fishing tackle comprising a holder including stems having ends adapted for connection to a fishing line and a fish-hook, respectively, and connected for relative movement, and a coil spring around the stems for yieldingly resisting such relative movement, a sinker forming a hollow body adapted to extend around said stems and including mating sections separable from the stems, and means on said stems actuated by the coil spring for releasably engaging the ends of and holding the mating sections together, said means being movable apart to release the sections of the sinker for their separation from said stems.

5. Fishing tackle comprising: a holder including extensibly connected stems having ends adapted for connection to a fishing line and a fish-hook, respectively, and spring means around said stems for yieldingly resisting their extension, a sinker separable from said stems and thimbles on said stems and actuated by the spring means, for releasably engaging the ends of and holding the sections of the sinker around said stems, and movable apart for dropping the sections when said stems are extended.

6. Fishing tackle comprising a pair of slidably connected stems, one of which has means at its outer end for connecting it to a fishing line and the other of which has means at its outer end for connection to a fish hook, a sinker including separable mating sections surrounding and separable from said stems, elements on the outer ends of the stems, respectively, for detachably engaging and gripping the ends of the sections sinker, said elements being movable apart by relative sliding movement of the stems to release the sections and permit them to drop off the stems, a compression spring around the stems, for yieldingly holding the stems to clamp the sections longitudinally between said elements, the spring permitting sliding movement between the stems for separating the elements to drop the sections when a predetermined pull exerted on the hook produces movement of one stem relatively to the other against the force of the spring.

7. Fishing tackle comprising a pair of slidably connected overlapped stems, one of which has means at its outer end for connecting it to a fishing line and the other of which has means at its outer end for connection to a fish hook, a sinker including separable mating sections surrounding and separable from said stems, elements on the outer ends of the stems, respectively, for detachably engaging and gripping the ends of the sections, said elements being movable apart by relative sliding movement of the stem to release the sections, hooks on the inner ends of the stems, a compression spring around the stems, and between the hooks for yieldingly holding the stems to clamp the sections longitudinally between said elements, the spring being adapted to permit sliding movement between the stems for separating the elements to drop the sections when a predetermined pull is exerted on the fish hook, which produces movement of one stem relatively to the other against the force of the spring.

8. In a fishing tackle, a holder comprising slidably connected sections adapted for connection to a fishing line and to a fish hook respectively, and including end members, and spring means applied to the sections, in combination with a sinker, said sinker including separable sections defining an annular body adapted to be positioned around the holder and between the end members, said spring means being adapted to hold the end members to retain the sinker-sections and to release and drop them when a predetermined pull is exerted on the holder.

9. A fishing tackle comprising in combination a sinker and a holder, said sinker being separable from said holder and including separable sections, said holder comprising slidably connected elements adapted for connection to a fishing line and a fish hook respectively, and spring means for yieldingly resisting sliding movement of the elements, said elements having means for releasably engaging the ends of the sinker, the sections of said sinker being releasable from said holder when a predetermined pull is exerted on the means that engages the ends of the sinker against resistance of the spring means.

10. A fishing tackle comprising in combination a sinker and a holder, said sinker being separable from said holder and including separable sections provided with reduced ends, said holder comprising slidably connected elements adapted for connection to a fishing line and a fish hook respectively, and spring means for yieldingly resisting sliding movement of the elements, said elements having means for releasably engaging the reduced ends of the sinker, the sections of said sinker being releasable from said holder when a predetermined pull is exerted on the means that engages the ends of the sinker against resistance of the spring means.

RICHARD W. KRITZER.

REFERENCES CITED

The following references are of record in the file of this patent:

UNITED STATES PATENTS

| Number | Name | Date |
| --- | --- | --- |
| 549,332 | Sewell | Nov. 5, 1895 |
| 575,674 | Woodward | Jan. 19, 1897 |
| 1,296,370 | Darling | Mar. 4, 1919 |
| 2,190,449 | Goldammer | Feb. 13, 1940 |